United States Patent
Huang et al.

(10) Patent No.: US 12,371,303 B2
(45) Date of Patent: Jul. 29, 2025

(54) MAINTENANCE TRAJECTORY TRACING FOR ELEVATOR SYSTEM

(71) Applicant: Otis Elevator Company, Farmington, CT (US)

(72) Inventors: Wenbo Huang, Shanghai (CN); Ke Yang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1384 days.

(21) Appl. No.: 16/127,885

(22) Filed: Sep. 11, 2018

(65) Prior Publication Data
US 2019/0077631 A1 Mar. 14, 2019

(30) Foreign Application Priority Data
Sep. 11, 2017 (CN) .......................... 201710811218.9

(51) Int. Cl.
  *B66B 1/34* (2006.01)
  *B66B 5/00* (2006.01)
  *H04B 5/72* (2024.01)

(52) U.S. Cl.
  CPC ............ *B66B 5/005* (2013.01); *B66B 1/3461* (2013.01); *B66B 5/0087* (2013.01); *B66B 1/3492* (2013.01); *H04B 5/72* (2024.01)

(58) Field of Classification Search
  CPC . B66B 5/00–0068; B66B 5/0087; B66B 5/02; B66B 5/04
  See application file for complete search history.

(56) References Cited

U.S. PATENT DOCUMENTS

| | | | |
|---|---|---|---|
| 6,674,403 B2 | 1/2004 | Gray et al. | |
| 7,034,683 B2 | 4/2006 | Ghazarian | |
| 7,775,330 B2 * | 8/2010 | Kattainen | ............ B66B 5/0031 187/287 |
| 8,355,693 B2 | 1/2013 | Karaoguz et al. | |

(Continued)

FOREIGN PATENT DOCUMENTS

| | | |
|---|---|---|
| CN | 103832904 B | 3/2016 |
| CN | 205151423 U | 4/2016 |

(Continued)

OTHER PUBLICATIONS

European Search Report for application EP 18192619.7, dated Mar. 6, 2019, 34 pages.

(Continued)

*Primary Examiner* — Christopher Uhlir
(74) *Attorney, Agent, or Firm* — CANTOR COLBURN LLP

(57) ABSTRACT

The present invention relates to the tracking of a maintenance trajectory in an elevator system. An apparatus provided by the present invention for tracking a maintenance trajectory in an elevator system is configured to generate, based on acquired relative height information of a maintenance worker entity in a lifting passage corresponding to the elevator system, maintenance trajectory information corresponding to the maintenance worker entity. The present invention makes it easy to implement monitoring or management of each maintenance operation of each maintenance worker entity, and also makes it easy to judge the compliance status of the maintenance operation.

8 Claims, 5 Drawing Sheets

(56) References Cited

U.S. PATENT DOCUMENTS

| | | | |
|---|---|---|---|
| 8,602,171 B2 * | 12/2013 | Vogl | B66B 5/005 187/314 |
| 8,712,686 B2 | 4/2014 | Bandyopadhyay et al. | |
| 8,843,350 B2 | 9/2014 | Jacobi et al. | |
| 9,182,240 B2 | 11/2015 | Poornachandran et al. | |
| 2008/0283342 A1 | 11/2008 | Deplazes et al. | |
| 2011/0112943 A1 | 5/2011 | Dietz et al. | |
| 2015/0006100 A1 | 1/2015 | Jackson et al. | |
| 2015/0177711 A1 | 6/2015 | Yuzurihara et al. | |
| 2016/0106368 A1 | 4/2016 | Wu et al. | |
| 2016/0125348 A1 | 5/2016 | Dyer et al. | |
| 2016/0132839 A1 | 5/2016 | Randolph | |
| 2017/0045359 A9 | 2/2017 | Barfield et al. | |
| 2017/0102467 A1 | 4/2017 | Nielsen et al. | |
| 2019/0322485 A1 * | 10/2019 | Kattainen | B66B 5/0056 |

FOREIGN PATENT DOCUMENTS

| | | |
|---|---|---|
| CN | 106355126 | 1/2017 |
| JP | 2011184121 A | 9/2011 |
| JP | 2013171383 A | 9/2013 |
| JP | 2017141081 A | 8/2017 |
| WO | 2011019810 A1 | 2/2011 |

OTHER PUBLICATIONS

ExatTime "Employee GPS Tracking App", available at: https://www.exaktime.com/time-clock-app/gps-tracking/, accessed: Sep. 10, 2018, 3 pages.

Flexiray, "RFID Personnel & People Monitoring", available at: https://www.flexiray.com/rfid-applications/people-monitoring, accessed: Sep. 10, 2018, 5 pages.

Ku, Jin-Hee and Park, Duk-Kyu, "Developing Safety Management Systems for Track Workers Using Smart Phone GPS", International Journal of Control and Automationl, vol. 6, No. 6, 2013, pp. 137-148.

Mobistealth, "Ultimate Cell Phone Monitoring Software" available at: https://www.mobistealth.com/, accessed: Sep. 10, 2018, 5 pages.

Smith, Charles, "3 Ways to Track a Cell Phone without Them Knowing", available at: https://www.phonehack.net/mobile-tracker/track-a-cell-phone-without-them-knowing.html?f=/ad/&gclid=EAlalQobChMI_Ymv78ed3QIVC0BpCh3WmwCfEAAYASAAEgKAGvD_BWE, accessed: Sep. 10, 2018, 17 pages.

* cited by examiner

MAINTENANCE TRAJECTORY TRACING FOR ELEVATOR SYSTEM

FOREIGN PRIORITY

This application claims priority to Chinese Patent Application No. 201710811218.9, filed Sep. 11, 2017, and all the benefits accruing therefrom under 35 U.S.C. § 119, the contents of which in its entirety are herein incorporated by reference.

TECHNICAL FIELD

The present invention pertains to the technical field of elevators, and relates to maintenance of elevator systems, and particularly to the tracking of a maintenance trajectory in an elevator system.

BACKGROUND ART

Numerous key devices (for example, an elevator car, and various devices in a machine room) of an elevator system are disposed inside a lifting passage. According to maintenance rules or regulations for elevator systems, maintenance personnel (or referred to as a maintenance worker) need to carry out periodic on-site maintenance for various devices inside the lifting passage. Corresponding industry regulations have defined corresponding maintenance operation specifications, for example, requiring maintenance personnel to carry out maintenance starting from a machine room at the top of the lifting passage and ending at the bottom of the lifting passage.

However, it is difficult to monitor or manage the on-site maintenance work of maintenance personnel inside the lifting passage, and it is also quite challenging to determine whether the maintenance personnel perform maintenance operations for various devices in the elevator system strictly based on a maintenance operation specification.

SUMMARY OF THE INVENTION

An objective of the present invention is to disclose a solution to eliminate or at least alleviate the above-mentioned defects in prior-art solutions.

According to a first aspect of the present invention, an apparatus for tracking a maintenance trajectory in an elevator system is provided, the apparatus being configured to generate, based on acquired relative height information of a maintenance worker entity in a lifting passage corresponding to the elevator system, maintenance trajectory information corresponding to the maintenance worker entity.

According to a second aspect of the present invention, a method for tracking a maintenance trajectory in an elevator system is provided, including a step of: generating, based on acquired relative height information of a maintenance worker entity in a lifting passage corresponding to the elevator system, maintenance trajectory information corresponding to the maintenance worker entity.

According to a third aspect of the present invention, a mobile terminal is provided, including a memory, a processor, and a computer program stored in the memory and executable by the processor, wherein when executing the program, the processor implements the step of the method according to the second aspect of the present invention.

According to a fourth aspect of the present invention, a computer device is provided, including a memory, a processor, and a computer program stored in the memory and executable by the processor, wherein when executing the program, the processor implements the step of the method according to the second aspect of the present invention.

According to a fourth aspect of the present invention, a computer readable storage medium storing a computer program is provided, wherein the program is executed by a processor to implement the step of the method according to the second aspect of the present invention.

The foregoing features and operations of the present invention will become more evident according to the following descriptions and accompanying drawings.

BRIEF DESCRIPTION OF THE DRAWINGS

The following detailed description with reference to the accompanying drawings will make the foregoing and other objectives and advantages of the present invention more complete and clearer, wherein identical or similar elements are represented by using identical reference numerals.

DETAILED DESCRIPTION

Figure 1:
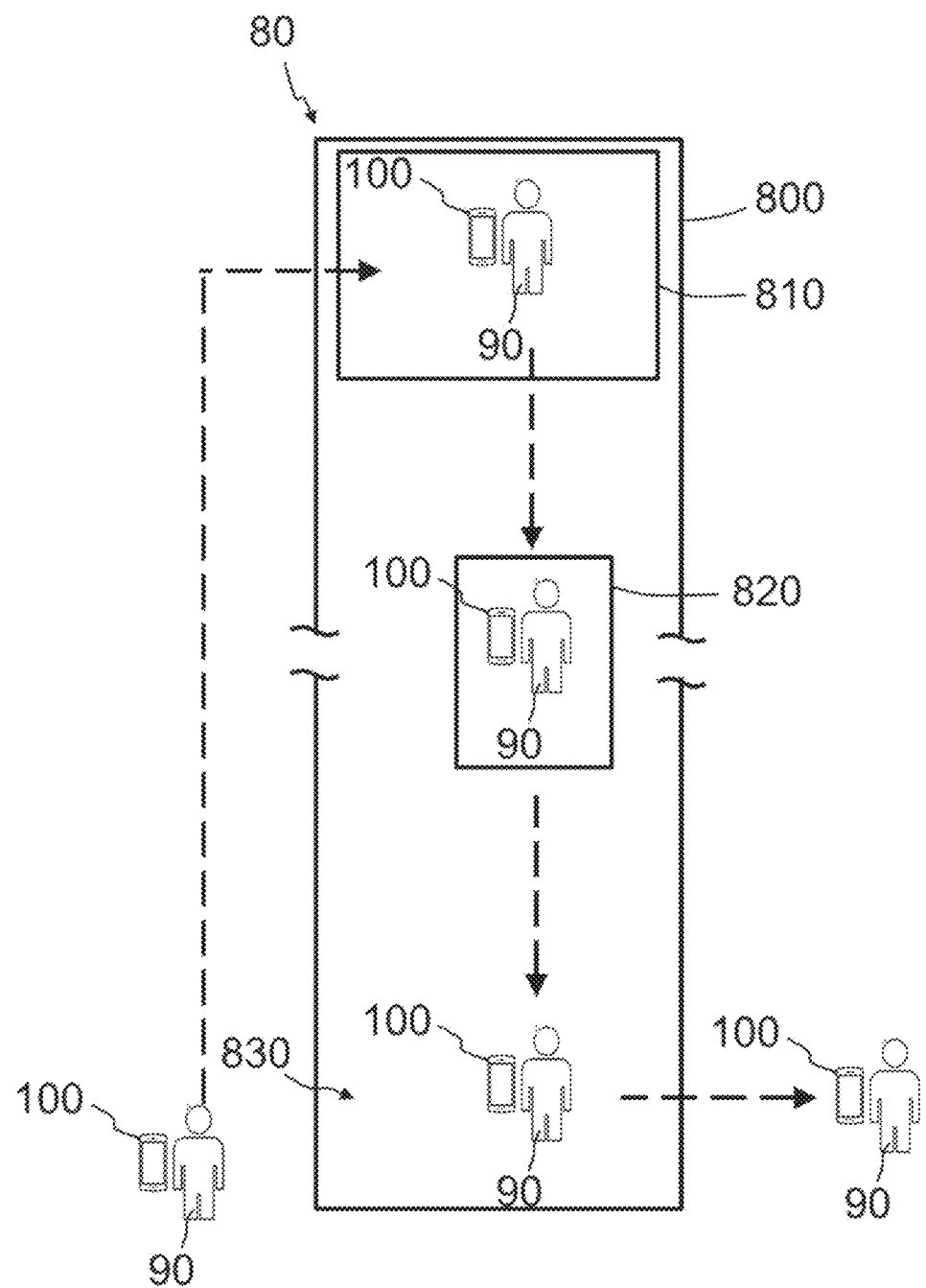
FIG. 1 is a schematic diagram of an application scenario of an apparatus or method for tracking a maintenance trajectory in an elevator system according to an embodiment of the present invention.

The following will describe some of a plurality of possible embodiments of the present invention to provide a basic understanding of the present invention, rather than determining key or decisive elements of the present invention or defining the scope to be protected. It can be readily understood that according to the technical solution of the present invention, those of ordinary skill in the art may propose other interchangeable implementation manners without changing the essence and spirit of the present invention. Therefore, the following specific implementation manners and the accompanying drawings are merely exemplary descriptions of the technical solution of the present invention and should not be construed as the entirety of the present invention or construed as limiting the technical solution of the present invention.

The present invention is now described more thoroughly with reference to the accompanying drawings. The drawings show exemplary embodiments of the present invention. However, the present invention can be implemented in many different forms and should not be construed as being limited by the embodiments illustrated herein. On the contrary, these embodiments are provided to make the present disclosure thorough and complete, and fully convey the idea of the present invention to those skilled in the art. The same reference numeral in the accompanying drawings denotes the same element or component, and therefore the description thereof will be omitted.

For ease of description herein, the "apparatus for tracking a maintenance trajectory in an elevator system" of the present invention is briefly referred to as a "tracking apparatus," and the "method for tracking a maintenance trajectory in an elevator system" of the present invention is briefly referred to as a "tracking method."

Figure 2:
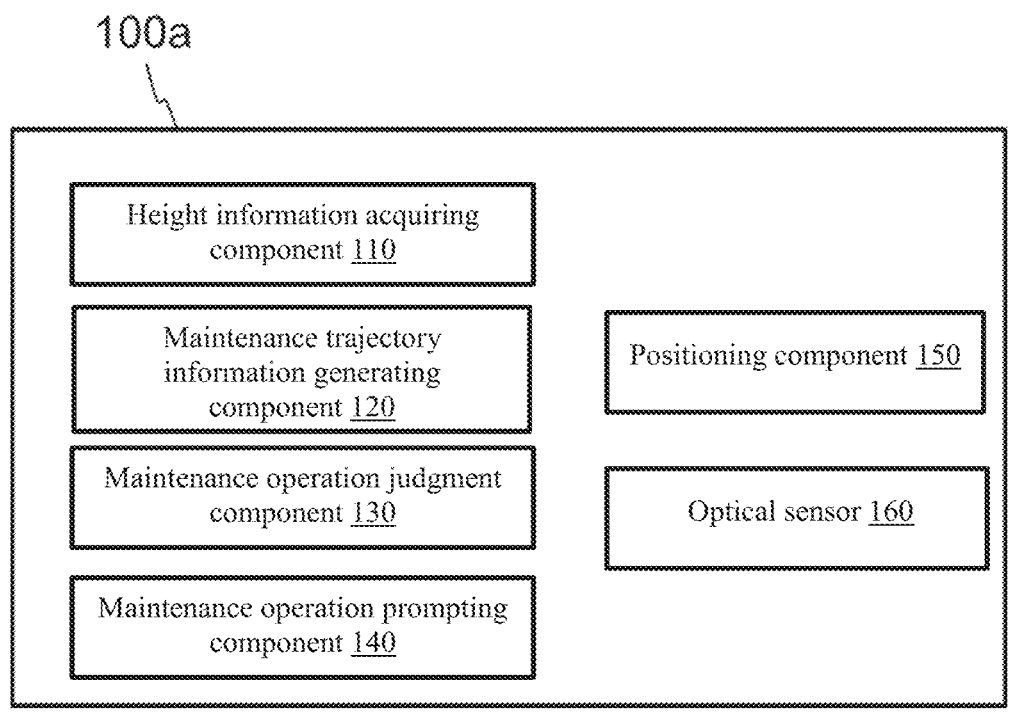
FIG. 2 is a schematic structural block diagram of an apparatus for tracking a maintenance trajectory in an elevator system according to an embodiment of the present invention.

FIG. 1 is a schematic diagram of an application scenario of an apparatus or method for tracking a maintenance trajectory in an elevator system according to an embodiment of the present invention. FIG. 2 is a schematic structural block diagram of a tracking apparatus according to an embodiment of the present invention. The tracking apparatus of the embodiment shown in FIG. 2 is implemented by using a mobile terminal 100*a*. The mobile terminal 100*a* corresponds to a mobile terminal 100 in FIG. 1. When performing a maintenance operation for an elevator system 80, a maintenance worker entity 90 carries or is installed with the mobile terminal 100. The maintenance worker entity 90 is generally one or more maintenance workers or may be a robot capable of implementing maintenance work. The mobile terminal 100 is optionally a personal mobile terminal 200, and may be a smart phone, a wearable smart device (for example, a smart band), or a personal digital assistant (PDA), which is provided with a processor and a memory and may be installed with a corresponding application (APP) to implement the functions of the tracking apparatus of the embodiments of the present invention.

The tracking apparatus of the embodiments of the present invention is described below with reference to FIG. 1 and FIG. 2.

The maintained elevator system 80 is disposed correspondingly to a lifting passage 800 (for example, a hoistway or a vertical shaft) in a building. Various devices of the elevator system 80 are disposed in the lifting passage 800, for example, a machine room 90 disposed at the top of the lifting passage 800, an elevator car 820 capable of moving vertically in the lifting passage 800, and a device (not shown) disposed at the bottom 830 of the lifting passage 800. Relative height information of various devices in the lifting passage 800 is known. For example, maintenance operations need to be performed for the machine room 90, devices in the machine room 90, the elevator car 820, and the device at the bottom 830 of the lifting passage 800 based on a maintenance operation specification. According to the maintenance operation specification, the maintenance worker entity 90 carrying the mobile terminal 100*a* will proceed in sequence approximately along a direction indicated by dashed arrows shown in FIG. 1 and stay for a time when performing a maintenance operation for a corresponding device. Therefore, when the maintenance worker entity 90 performs a maintenance operation for the elevator system 80, the maintenance operation process basically can be reflected by changes in the relative height information of the maintenance worker entity 90 in the lifting passage 800.

It should be noted that the types and number of devices in the elevator system 80 in the lifting passage 800 and/or the positions of the devices are not limited and may vary with the type of the elevator system 80 and the structure of the lifting passage 800 in the building. Also, the maintenance operation specification is not fixed, and may vary with user needs and the type of the elevator system. Therefore, when performing a maintenance operation, the maintenance worker entity 90 is not limited to moving along the direction indicated by the dashed arrows shown in FIG. 1.

It should be noted that the relative height information of the maintenance worker entity 90 in the lifting passage 800 may be defined based on an absolute height and a reference height of the lifting passage 800, for example, defined as a height difference relative to the lifting passage 800 as a reference.

The mobile terminal 100*a* shown in FIG. 2 includes a height information acquiring component 110. In a maintenance operation process performed by the maintenance worker entity 90 as shown in FIG. 1, the height information acquiring component 110 may acquire the relative height information of the maintenance worker entity 90 in the lifting passage 800 corresponding to the elevator system 80.

In an embodiment, the height information acquiring component 110 is configured to determine the relative height information based on at least one of the following: a barometric pressure sensor, a global positioning system (GPS) sensor, an accelerometer, a gyroscope, near field communication (NFC), radio frequency identification (RFID) or other radio frequency signal strength indications, and a camera. Specifically, a corresponding height-sensitive component may be directly integrated in the mobile terminal 100*a* to acquire through sensing the relative height information of the maintenance worker entity 90. The height-sensitive component may include, but is not limited to, a barometric pressure sensor, a global positioning system sensor, an accelerometer, a gyroscope, near field communication, radio frequency identification or other RF signal strength indications, and a camera.

For example, when a barometric pressure sensor is used, the barometric pressure sensor may be integrated and installed in the mobile terminal 100*a*. When the mobile terminal 100*ab* moves vertically along with the maintenance worker entity 90 that performs the maintenance operation, a relative change in the atmospheric pressure value can be detected, and therefore the height information acquiring component 110 can calculate the relative height information in the lifting passage 800. In addition, the precision can reach, for example, 0.1 m.

For another example, when a camera is used, if vertical positions in the vertical space of the lifting passage 800 are identified by using one or more pattern features, a photograph of a surrounding scene or a machine-readable code positioned therein can be used to determine the relative height information.

It should be noted that the relative height information sensed in real time by the height-sensitive component may be acquired in real time by the height information acquiring component 110 or may be acquired periodically or by stages by the height information acquiring component 110.

It should be noted that the height-sensitive component not only can acquire the relative height information of the maintenance worker entity 90 in the lifting passage 800, but also can sense relative height information of the maintenance worker entity 90 relative to the lifting passage 800 if he/she leaves the lifting passage 800 at a particular height in practical applications. That is to say, the height information acquiring component 110 not only can acquire relative height information inside the lifting passage 800, but also can acquire relative height information outside the lifting passage 800.

It will be understood that the height-sensitive component used in the mobile terminal 100*a* is not limited to the above embodiments, and various height-sensitive components that already exist or will appear in the future after the filing date can also be used. The more accurately the height-sensitive component senses the relative height information, the more accurate maintenance trajectory information of the corresponding maintenance worker entity 90 will be formed.

Still as shown in FIG. 2, in an embodiment, the mobile terminal 100*a* further includes an optical sensor 160. The sensor 160 can sense brightness information at a current height of the maintenance worker entity 90. Generally, the brightness is low inside the lifting passage 800 and high outside the lifting passage 800. The maintenance trajectory generating component 120 shown in FIG. 2 may determine based on the brightness information acquired by the optical sensor 160 whether the maintenance worker entity 90 at the current height is located inside the lifting passage 800. For example, when the brightness information is less than a predetermined value, it is determined that the currently acquired relative height information is relative height information corresponding to inside of the lifting passage 800. Definitely, at a position approximately corresponding to a height of the elevator car 820, the maintenance trajectory generating component 120 determines based on the brightness information whether the corresponding maintenance worker entity 90 approximately at the height of the elevator car 820 is located inside the elevator car 820 or on the top of the elevator car 820. Specifically, if the brightness information is less than a predetermined value, it is determined that the currently acquired relative height information approximately corresponding to the elevator car 820 is relative height information corresponding to the top of the elevator car 820, and therefore, it can be determined that the maintenance worker entity 90 is currently located on the top of the elevator car 820; if the brightness information is greater than a predetermined value, it is determined that the currently acquired relative height information approximately corresponding to the elevator car 820 is relative height information corresponding to inside of the elevator car 820 (which is height information inside the lifting passage 800, not height information outside the lifting passage 800), and therefore, it can be determined that the maintenance worker entity 90 is currently located inside the elevator car 820.

Still as shown in FIG. 2, in an embodiment, the mobile terminal 100*a* further includes a positioning component 150. The positioning component 150 may be configured to acquire position information of the elevator system 80 currently maintained by the maintenance worker entity 90. Specifically, the positioning component 150 may use the GPS sensor in the mobile terminal 100*a* to acquire corresponding position information, for example, position information of the maintenance worker entity 90 during maintenance, that is, position information corresponding to the maintained elevator system 80. Because position information of each elevator system 80 that needs to be maintained is known, the mobile terminal 100*a* or the maintenance trajectory generating component 120 therein may determine the maintained elevator system 80 based on the position information obtained by the positioning component 150, so that maintenance trajectory information generated subsequently may correspond to the elevator system 80.

Still as shown in FIG. 2, the maintenance trajectory generating component 120 in the mobile terminal 100*a* may generate, based on relative height information of each maintenance worker entity 90, maintenance trajectory information corresponding to the maintenance worker entity 90. Specifically, relative height information inside the lifting passage 800 and/or outside the lifting passage 800 is mapped on a path along the height direction in a chronological order to generate the maintenance trajectory information. The maintenance trajectory information may be generated or updated in real time according to the progress of the maintenance work of the maintenance worker entity 90 in the lifting passage 800. Definitely, the maintenance trajectory information may also be generated or updated by stages. For example, when all relative height information during the maintenance work is obtained after the maintenance worker entity 90 completes the maintenance work, the maintenance trajectory information is generated at a time.

In an embodiment, the relative height information correspondingly has a timestamp (timestamp). The timestamp may be provided by a timing component in the mobile terminal 100*a* in the process of sensing each piece of relative height information. The corresponding maintenance trajectory information generated by the maintenance trajectory generating component 120 also includes dwell time information corresponding to the relative height information. In this way, the length of a dwell time of the maintenance worker entity 90 at a particular height may be determined based on the maintenance trajectory information. It will be understood that the dwell time at a particular height may also be used for judging compliance or a compliance status of a maintenance operation of the maintenance worker entity 90.

Still as shown in FIG. 2, the mobile terminal 100*a* further includes a maintenance operation judgment component 130. The maintenance operation judgment component 130 judges a compliance status of a maintenance operation of the corresponding maintenance worker entity 90 based on the maintenance trajectory information generated by the maintenance trajectory generating component 120. For example, if the generated maintenance trajectory information indicates that the corresponding maintenance worker entity 90 does not pass through the bottom 830, it may be judged that the maintenance worker entity 90 does not perform a maintenance operation for devices at the bottom 830 of the lifting passage 800 during the maintenance work, and the compliance status may be judged as noncompliant.

In an embodiment, specifically, the maintenance operation judgment component 130 is configured to compare the maintenance trajectory information with predetermined maintenance trajectory information generated based on a maintenance operation specification to judge the compliance status of the maintenance operation of the corresponding maintenance worker entity 90. The maintenance operation specification is an operation specification or workflow corresponding to each elevator system 80. The predetermined maintenance trajectory information may be, for example, maintenance trajectory information generated by the maintenance trajectory generating component 120 when the maintenance worker entity 90 correctly performs a maintenance operation according to the maintenance operation specification and may be used as standard maintenance trajectory information. Therefore, by comparing the maintenance trajectory information with the predetermined maintenance trajectory information, the compliance status of the maintenance operation of the corresponding maintenance worker entity 90 can be judged conveniently, or even a specific noncompliant position during the entire maintenance operation can be determined, to provide guidance for supplementary maintenance.

It should be noted that the criterion for judging the compliance status may be specifically determined depending on a specific user of the elevator system 80 and is not limited.

In an embodiment, the mobile terminal 100*a* further includes a maintenance operation prompting component 140, which may compare a part of maintenance trajectory information that has been generated with the predetermined maintenance trajectory information during the maintenance operation performed by the maintenance worker entity 90, to determine in substantially real time the compliance status of the maintenance operation already completed by the maintenance worker entity 90. The maintenance operation prompting component 140 prompts, based on the compliance status, the corresponding maintenance worker entity to perform a maintenance operation. In a specific example, when the maintenance worker entity 90 forgot to perform a maintenance operation for a device at a particular height position, the maintenance operation judgment component 130 may judge, according to maintenance trajectory information generated in real time, that the maintenance operation for the device is noncompliant, and the maintenance operation prompting component 140 may remind the maintenance worker entity 90 by means of voice and/or vibration, so that the maintenance worker entity 90 can perform the maintenance operation for the device in time.

Figure 3:
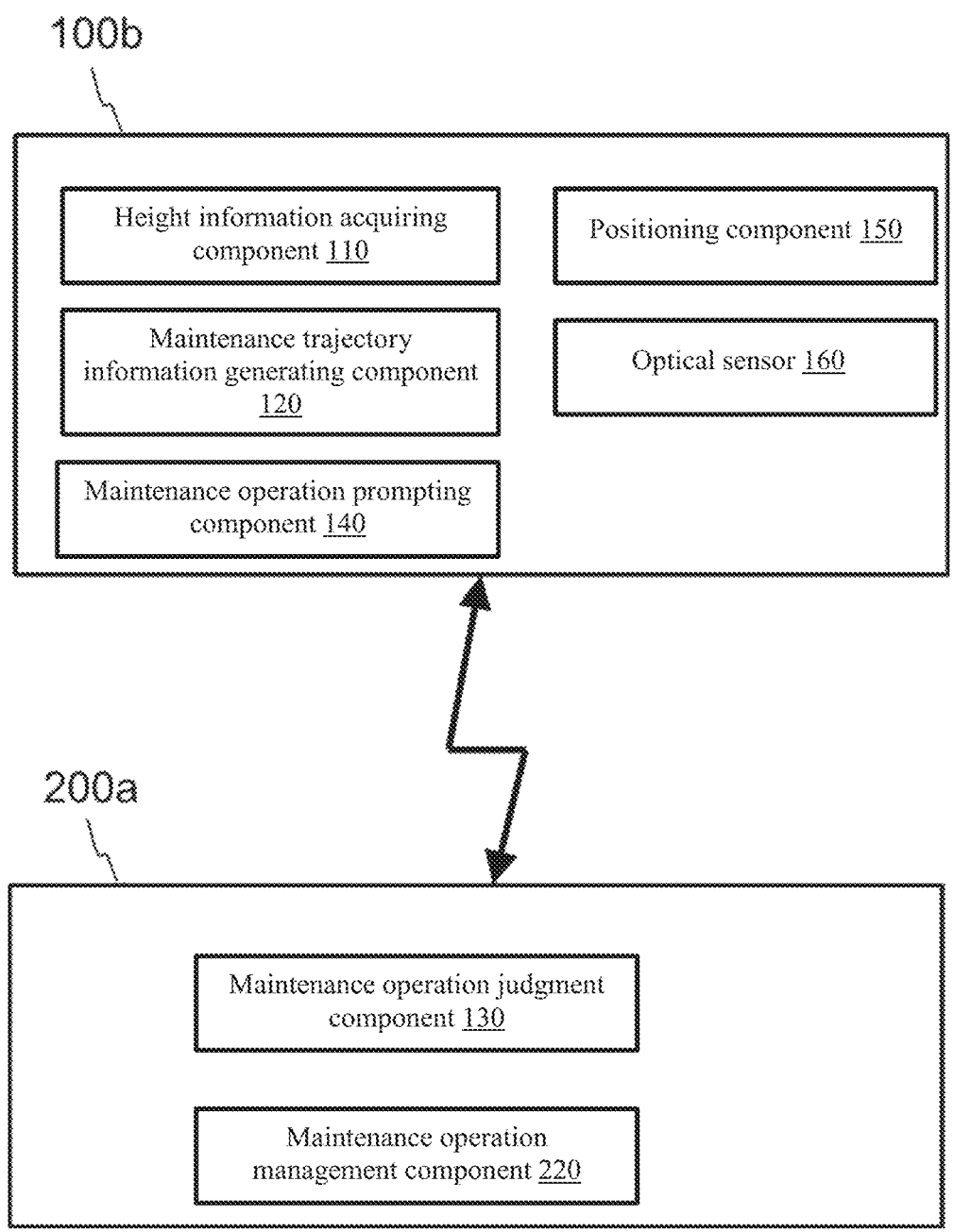
FIG. 3 is a schematic structural block diagram of an apparatus for tracking a maintenance trajectory in an elevator system according to another embodiment of the present invention.

FIG. 3 is a schematic structural block diagram of an apparatus for tracking a maintenance trajectory in an elevator system according to another embodiment of the present invention. In this embodiment, the tracking apparatus is implemented by using a mobile terminal 100b and a computer device 200a. The mobile terminal 100b and the computer device 200a can be in wired or wireless communication connection with each other, so that the two can perform data transmission at regular or irregular intervals. The computer device 200a may be specifically implemented by using a server installed in a building, or even may be implemented by cloud computing.

The tracking apparatus of the embodiment shown in FIG. 3 can also be applied to the scenario shown in FIG. 1. The mobile terminal 100b corresponds to the mobile terminal 100 in FIG. 1 and is also carried by a maintenance worker entity 90. Referring to FIG. 1 to FIG. 3, it can be seen that the mobile terminal 100b also has the height information acquiring component 110, the maintenance trajectory information generating component 120, the maintenance operation prompting component 140, the positioning component 150, and the optical sensor 160 in the mobile terminal 100a in the embodiment shown in FIG. 2, and details will not be described herein again.

Maintenance trajectory information generated by the maintenance trajectory information generating component 120 of each mobile terminal 100b may be sent in real time to the computer device 200a. The computer device 200a includes a maintenance operation judgment component 130. The corresponding maintenance operation judgment component 130 may store corresponding predetermined maintenance trajectory information. The maintenance operation judgment component 130 is also configured to judge, based on the maintenance trajectory information sent by each mobile terminal 100b, a compliance status of a maintenance operation of the corresponding maintenance worker entity 90.

The compliance status of the maintenance operation of the maintenance worker entity 90 that is obtained by the maintenance operation judgment component 130 in the computer device 200a may be returned to the corresponding mobile terminal 100b for displaying. The maintenance operation prompting component 140 may also prompt, based on the compliance status, the maintenance worker entity 90 to perform a correct maintenance operation.

Still as shown in FIG. 3, the computer device 200a further includes a maintenance management component 220. The computer device 200a can manage maintenance work of a plurality of elevator systems 80, and therefore can receive and store a plurality of pieces of maintenance trajectory information of a plurality of maintenance worker entities 90. The maintenance management component 220 is configured to manage, analyze, and/or display one or more pieces of received maintenance trajectory information corresponding to one or more maintenance worker entities 90, allowing management personnel to more intuitively, accurately, and conveniently learn a maintenance status of each elevator system 80 and/or a maintenance operation status of each maintenance worker entity 90. The specific management method and/or analysis method is not limited, and may be, for example, various existing analysis algorithms such as statistical analysis and comparative analysis.

Figure 4:
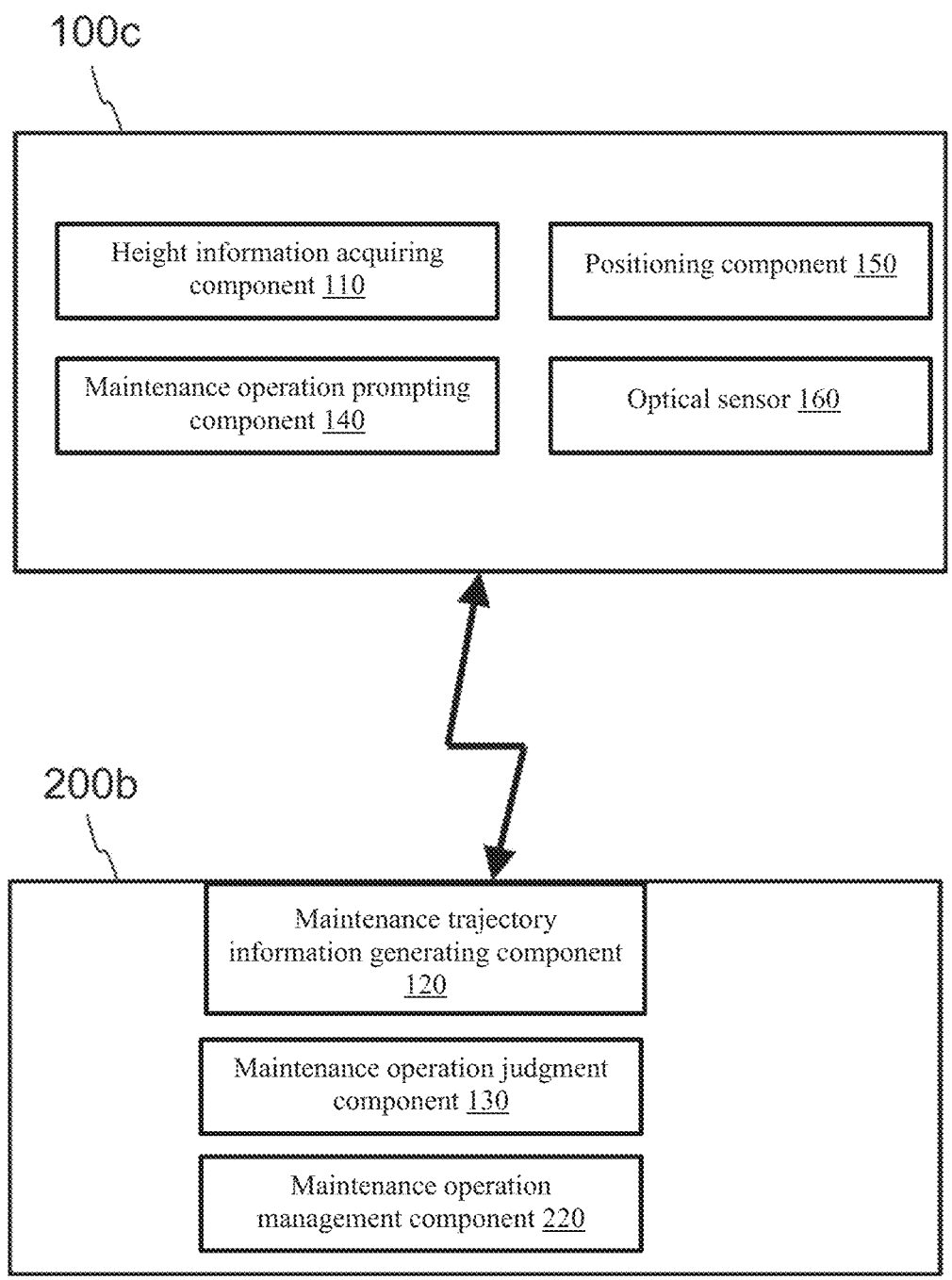
FIG. 4 is a schematic structural block diagram of an apparatus for tracking a maintenance trajectory in an elevator system according to still another embodiment of the present invention.

FIG. 4 is a schematic structural block diagram of an apparatus for tracking a maintenance trajectory in an elevator system according to still another embodiment of the present invention. In this embodiment, the tracking apparatus is implemented by using a mobile terminal 100c and a computer device 200b. The mobile terminal 100c and the computer device 200b can be in wired or wireless communication connection with each other, so that the two can perform data transmission at regular or irregular intervals. The computer device 200b may be specifically implemented by using a server installed in a building, or even may be implemented by cloud computing.

The tracking apparatus of the embodiment shown in FIG. 4 can also be applied to the scenario shown in FIG. 1. The mobile terminal 100c corresponds to the mobile terminal 100 in FIG. 1 and is also carried by a maintenance worker entity 90. Referring to FIG. 1 to FIG. 4, it can be seen that the mobile terminal 100c also has the height information acquiring component 110, the maintenance operation prompting component 140, the positioning component 150, and the optical sensor 160 in the mobile terminal 100a in the embodiment shown in FIG. 2, and details will not be described herein again.

Information (for example, relative height information) acquired by the height information acquiring component 110, the maintenance operation prompting component 140, the positioning component 150, and the optical sensor 160 of each mobile terminal 100c may be sent in real time or at regular intervals to the computer device 200a. The computer device 200a includes a maintenance trajectory information generating component 120 and a maintenance operation judgment component 130 similar to those shown in FIG. 2. The maintenance trajectory information generating component 120 is also configured to generate, based on the relative height information, maintenance trajectory information corresponding to the maintenance worker entity 90. The maintenance operation judgment component 130 is also configured to judge, based on the maintenance trajectory information sent by each mobile terminal 100b, a compliance status of a maintenance operation of the corresponding maintenance worker entity 90. Details will not be described herein again.

The compliance status of the maintenance operation of the maintenance worker entity 90 that is obtained by the maintenance operation judgment component 130 in the computer device 200b may be returned to the corresponding mobile terminal 100c for displaying. The maintenance operation prompting component 140 may also prompt, based on the compliance status, the maintenance worker entity 90 to perform a correct maintenance operation.

Still as shown in FIG. 4, the computer device 200b further includes a maintenance management component 220. The computer device 200b can manage maintenance work of a plurality of elevator systems 80, and therefore can receive and store a plurality of pieces of maintenance trajectory information of a plurality of maintenance worker entities 90. The maintenance management component 220 is configured to manage, analyze, and/or display one or more pieces of received maintenance trajectory information corresponding to one or more maintenance worker entities 90, allowing management personnel to more intuitively, accurately, and conveniently learn a maintenance status of each elevator system 80 and/or a maintenance operation status of each maintenance worker entity 90. The specific management method and/or analysis method is not limited, and may be, for example, various existing analysis algorithms such as statistical analysis and comparative analysis.

The tracking apparatus of the above embodiments can generate corresponding maintenance trajectory information for each maintenance operation of each maintenance worker entity, making it easy to implement monitoring or management of each maintenance operation of each maintenance worker entity, and also making it easy to judge the compliance status of each maintenance operation of each maintenance worker entity based on the maintenance trajectory information to determine whether maintenance personnel perform maintenance operations for various devices in the elevator system strictly based on a maintenance operation specification, thereby facilitating management of maintenance operations for the elevator system.

Figure 5:
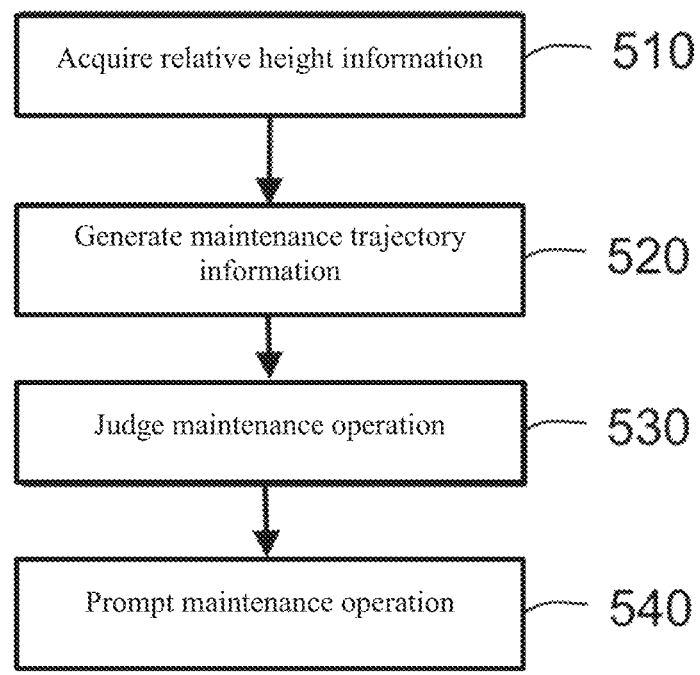
FIG. 5 is a schematic flowchart of a method for tracking a maintenance trajectory in an elevator system according to an embodiment of the present invention.

FIG. 5 is a schematic flowchart of a method for tracking a maintenance trajectory in an elevator system according to an embodiment of the present invention. The tracking method shown in FIG. 5 may be implemented in the tracking apparatus of any one of the embodiments shown in FIG. 2 to FIG. 4. The following describes in detail the tracking method of this embodiment of the present invention by way of example with reference to FIG. 1 to FIG. 5.

In step S510, relative height information of a maintenance worker entity 90 in a lifting passage 800 corresponding to an elevator system 80 is acquired. In this step, the relative height information may be acquired in real time through sensing by a height-sensitive component integrated into a mobile terminal 100, or may be received from other devices, for example, received from a height-sensitive component outside the mobile terminal 100 or from the mobile terminal 100. Specifically, the relative height information may be acquired in real time or at regular intervals.

In some embodiments, the relative height information is determined based on at least one of the following: a barometric pressure sensor, a global positioning system sensor, an accelerometer, a gyroscope, near field communication, radio frequency identification or other radio frequency signal strength indications, and a camera.

In some embodiments, in step S510, position information of an elevator system currently maintained by the maintenance worker entity is further acquired. For example, the position information may be obtained through positioning using a GPS sensor in the mobile terminal 100.

In some embodiments, in step S510, brightness information at a current height of the maintenance worker entity is further sensed. Specifically, when the relative height information is sensed, brightness information at the corresponding height is acquired through sensing using an optical sensor 160.

In step S520, maintenance trajectory information corresponding to the maintenance worker entity 90 is generated based on the relative height information. Specifically, relative height information inside the lifting passage 800 and/or outside the lifting passage 800 is mapped on a path along the height direction in a chronological order to generate the maintenance trajectory information. The maintenance trajectory information may be generated or updated in real time according to the progress of the maintenance work of the maintenance worker entity 90 in the lifting passage 800. Definitely, the maintenance trajectory information may also be generated or updated by stages. For example, when all relative height information during the maintenance work is obtained after the maintenance worker entity 90 completes the maintenance work, the maintenance trajectory information is generated at a time.

In some embodiments, the relative height information correspondingly has a timestamp (timestamp). The timestamp may be provided by a timing component in the mobile terminal 100*a* in the process of sensing each piece of relative height information. The corresponding maintenance trajectory information generated by a maintenance trajectory generating component 120 also includes dwell time information corresponding to the relative height information. In this way, the length of a dwell time of the maintenance worker entity 90 at a particular height may be determined based on the maintenance trajectory information.

In an embodiment, corresponding to step S520, the maintained elevator system may further be determined based on the position information of the elevator system 80. Because position information of each elevator system 80 that needs to be maintained is known, the mobile terminal 100*a* or the maintenance trajectory generating component 120 therein may determine the maintained elevator system 80 based on the position information obtained by a positioning component 150, so that maintenance trajectory information generated subsequently may correspond to the elevator system 80.

In an embodiment, corresponding to step S520, it may further be determined based on the brightness information whether the maintenance worker entity 90 at the current height is located inside the lifting passage 800; and/or it may further be determined based on the brightness information whether the corresponding maintenance worker entity 90 approximately at a height of an elevator car 820 in the elevator system 80 is located inside the elevator car 820 or on the top of the elevator car 820. For example, when the brightness information is less than a predetermined value, it is determined that the currently acquired relative height information is relative height information corresponding to inside of the lifting passage 800. Definitely, at a position approximately corresponding to a height of the elevator car 820, the maintenance trajectory generating component 120 determines based on the brightness information whether the corresponding maintenance worker entity 90 approximately at the height of the elevator car 820 is located inside the elevator car 820 or on the top of the elevator car 820. Specifically, if the brightness information is less than a predetermined value, it is determined that the currently acquired relative height information approximately corresponding to the elevator car 820 is relative height information corresponding to the top of the elevator car 820, and therefore, it can be determined that the maintenance worker entity 90 is currently located on the top of the elevator car 820; if the brightness information is greater than a predetermined value, it is determined that the currently acquired relative height information approximately corresponding to the elevator car 820 is relative height information corresponding to inside of the elevator car 820 (which is height information inside the lifting passage 800, not height information outside the lifting passage 800), and therefore, it can be determined that the maintenance worker entity 90 is currently located inside the elevator car 820.

In step S530, a compliance status of a maintenance operation of the corresponding maintenance worker entity 90 is judged based on the maintenance trajectory information.

In an embodiment, the maintenance trajectory information is compared with predetermined maintenance trajectory information generated based on a maintenance operation specification to judge the compliance status of the maintenance operation of the corresponding maintenance worker entity 90. The maintenance operation specification is an operation specification or workflow corresponding to each elevator system 80. The predetermined maintenance trajectory information may be, for example, maintenance trajectory information generated by the maintenance trajectory generating component 120 when the maintenance worker entity 90 correctly performs a maintenance operation according to the maintenance operation specification and may be used as standard maintenance trajectory information.

In an embodiment, the relative height information correspondingly has a timestamp (timestamp). The timestamp may be provided by a timing component in the mobile terminal 100 in the process of sensing each piece of relative height information. The corresponding maintenance trajectory information generated also includes dwell time information corresponding to the relative height information. In this way, the length of a dwell time of the maintenance worker entity 90 at a particular height may be determined based on the maintenance trajectory information. In the process of comparing the maintenance trajectory information with the predetermined maintenance trajectory information for judgment, the dwell time at a particular height may also be compared, to judge compliance or a compliance status of a maintenance operation of the maintenance worker entity 90.

Similar to the manner in which the maintenance trajectory information is generated, the judgment of the compliance status may be performed in real time according to the progress of the maintenance operation, or by stages, or after the maintenance operation is completed and the maintenance trajectory information is generated.

In an embodiment, the method further includes step S540: prompting, based on the compliance status, the corresponding maintenance worker entity to perform a maintenance operation. This step may be implemented by a maintenance operation prompting component 140. Particularly, when the maintenance worker entity 90 needs to correctly complete a maintenance operation according to a maintenance operation specification, the maintenance worker entity 90 may be reminded in time by means of voice and/or vibration, thereby avoiding noncompliance or incompleteness of the maintenance operation.

The tracking method of the above embodiment may be implemented in the mobile terminal 100 or may be implemented jointly by the mobile terminal 100 and a computer device 200.

In the embodiments of the present invention, the maintenance trajectory information can reflect a corresponding movement trajectory of the maintenance worker entity in the height direction at least when the maintenance worker entity performs a maintenance operation in the lifting passage.

As will be appreciated by those skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "service," "circuit," "circuit system," "module" and/or "processing system." Furthermore, aspects of the present invention may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer (apparatus), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions and acts specified herein.

It should also be noted that in some alternative implementation manners, the functions/operations noted in the blocks may occur out of the order noted in the flowcharts. For example, two blocks shown in succession may in fact be executed substantially concurrently or the blocks may sometimes be executed in the reverse order, depending upon the functionality/operations involved. Although particular step sequences are shown, disclosed, and claimed, it should be appreciated that steps may be performed in any order, separated or combined unless otherwise indicated and will still benefit from the present disclosure.

This written description uses examples to disclose the present invention, including the best mode, and also to enable those skilled in the art to practice the present invention, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for tracking a maintenance trajectory in an elevator system, the apparatus being configured to:
   gather, over time, height information comprising:
      known relative height information of devices of the elevator system; and
      changing instances of relative height information of a maintenance worker entity inside the lifting passage and outside the lifting passage;
      wherein a first set of the changing instances of the relative height information of the maintenance worker represents the maintenance worker moving from one location to another location; and
      wherein a second set of the changing instances of the relative height information reflects the maintenance worker entity performing one or more maintenance operations for one or more periods of time; and
   use the gathered height information to generate maintenance trajectory information corresponding to the maintenance worker entity.

2. The apparatus according to claim 1, wherein:
   the one or more maintenance operations comprise a first maintenance operation; and
   the apparatus further comprises a maintenance operation judgment component configured to judge a compliance status of the first maintenance operation of the corresponding maintenance worker entity based on the maintenance trajectory information.

3. The apparatus according to claim 2, wherein the maintenance operation judgment component is further configured to compare the maintenance trajectory information with predetermined maintenance trajectory information generated based on a maintenance operation specification to judge the compliance status of the first maintenance operation of the corresponding maintenance worker entity.

4. The apparatus according to claim 2, further comprising:
   a maintenance operation prompting component configured to prompt, based on the compliance status, the corresponding maintenance worker entity to perform the first maintenance operation.

5. A method for tracking a maintenance trajectory in an elevator system, the method comprising:
   gathering, over time, height information comprising:
      known relative height information of devices of the elevator system; and
      changing instances of relative height information of a maintenance worker entity inside the lifting passage and outside the lifting passage;
      wherein a first set of the changing instances of the relative height information of the maintenance worker represents the maintenance worker moving from one location to another location; and
      wherein a second set of the changing instances of the relative height information reflects the maintenance worker entity performing one or more maintenance operations for one or more periods of time; and
   using the gathered height information to generating maintenance trajectory information corresponding to the maintenance worker entity.

6. The method according to claim 5, wherein:
   the one or more maintenance operations comprise a first maintenance operation; and
   the method further comprises judging a compliance status of the first maintenance operation of the corresponding maintenance worker entity based on the maintenance trajectory information.

7. The method according to claim 6, wherein in the step of judging the compliance status, the maintenance trajectory information is compared with predetermined maintenance trajectory information generated based on the first maintenance operation specification to judge the compliance status of the maintenance operation of the corresponding maintenance worker entity.

8. The method according to claim 6, further comprising a step of:
   prompting, based on the compliance status, the corresponding maintenance worker entity to perform the first maintenance operation.

* * * * *